2

United States Patent Office 3,640,904
Patented Feb. 8, 1972

3,640,904
CATALYST COMPRISING LAYERED CRYSTALLINE CLAY-TYPE ALUMINOSILICATE COMPONENT, AND METHOD OF ACTIVATING SAID CATALYST
Sigmund M. Csicsery, Lafayette, Donald A. Hickson, Richmond, and Joseph Jaffe, Berkeley, Calif., assignors to Chevron Research Company, San Francisco, Calif.
No Drawing. Filed Sept. 18, 1968, Ser. No. 760,676
Int. Cl. B01j *11/40*
U.S. Cl. 252—455 R
4 Claims

ABSTRACT OF THE DISCLOSURE

A hydrocarbon conversion catalyst comprising a layered crystalline clay-type aluminosilicate component and a hydrogenating component, said hydrogenating component preferably being selected from rhenium and compounds thereof and Group VIII metals and compounds thereof, said catalyst having an activity as developed therein by heating said catalyst in an oxygen-containing gas stream at 900° to 1150° F. for 0.5 to 20 hours, and the method of activating a catalyst having the indicated composition which comprises heating in the indicated manner.

---

This application relates to hydrocarbon conversion catalysts and to methods of activating said catalysts.

Prior art

It is known, particularly from Granquist U.S. Patent 3,252,757, that a relatively new layered crystalline aluminosilicate clay-type mineral that has been synthesized has the empirical formula

$$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0
$m$ is from 0.2 to 0.6
A is one equivalent of an exchangeable cation a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. is divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$ and $\frac{1}{2}Ba^{++}$, and mixtures thereof.

Said layered synthetic crystalline aluminosilicate mineral (hereinafter included in the term, used for brevity, "layered aluminosilicate," which term also is intended to include any other catalytically active layered crystalline aluminosilicate, whether synthetic or natural) is known to have application as a component of a catalytic cracking catalyst, and application of said layered aluminosilicate as a component of a hydrocracking catalyst have been disclosed in the copending application of Sigmund M. Csicsery and Joseph Jaffe, for "Hydrotreating Catalyst and Process," Ser. No. 752,538, filed Aug. 14, 1968, and in the copending application of Joseph Jaffe for "Hydrotreating Catalyst and Process," Ser. No. 750,283, filed Aug. 5, 1968.

It is also known that activation temperatures that develop optimum activity characteristics and other characteristics in catalysts vary widely, depending upon the catalyst composition. It is also known that the optimum activation temperaure ranges for developing optimum activities and other characteristics are difficult to predict with reasonable accuracy, in view of the high degree of empiricism associated with the catalyst art.

OBJECTS

In view of the foregoing, it is an object of the present invention to provide an improved method for activating catalysts comprising a layered crystalline clay-type aluminosilicate component and a hydrogenating component selected from rhenium and compounds thereof and Group VIII metals and compounds thereof whereby optimum activities and stabilities are developed in such catalysts, and to provide catalysts so activated.

STATEMENT OF INVENTION

In accordance with the present invention there is provided the method of activating a hydrocarbon conversion catalyst comprising a layered crystalline clay-type aluminosilicate component and a hydrogenating component, which comprises heating said catalyst at 900° to 1150° F. for 0.5 to 20 hours.

Preferably said heating is accomplished in a stream of air or other oxygen-containing gas.

The method of the present invention is especially useful in activating catalysts in which said hydrogenating component is selected from rhenium and compounds thereof and Group VIII metals and compounds thereof.

Further in accordance with the present invention there is provided a hydrocarbon conversion catalyst comprising a layered crystalline clay-type aluminosilicate component and a hydrogenating component selected from rhenium and compounds thereof and Group VIII metals and compounds thereof, said catalyst having an activity as developed therein by heating said catalyst in an oxygen-containing gas stream at 900° to 1150° F. for 0.5 to 20 hours.

EXAMPLES

The following examples are given for the purpose of further illustrating the practice of the present invention. However, it is to be understood that these examples are given by way of exemplification only, and are not intended in any way to limit the scope of the present invention.

EXAMPLE 1

A catalyst consisting of rhenium and a layered synthetic crystalline aluminosilicate mineral (Catalyst A) was prepared in the following manner:

These starting materials were used:

1. 500 grams of a layered synthetic crystalline aluminosilicate mineral as described in Granquist U.S. Pat. 3,252,757, in finely divided form;
2. 1000 cc. of an aqueous solution of perrhenic acid ($HReO_4$), containing 10.8 grams of rhenium.

The mineral, in lumpy powder form, was introduced into a Hobart kitchen blender, followed by slow addition of the perrhenic acid solution while stirring, to form a pasty mass. The pasty mass was transferred to a dish and dried at 120° F. for approximately 16 hours. The resulting dried material was pressed through a 40-mesh screen to obtain fine granules. The granules were blended with a 1% Sterotex lubricant binder, and tabletted. The tablets were calcined in flowing air for 5 hours at 950° F. The tabletted, calcined rhenium-containing material was crushed, and a resulting 8–16 mesh fraction thereof was separated for use as a catalyst. This catalyst contained an amount of rhenium approaching the theoretical amount based on the amounts of ingredients used. This indicates that, although rhenium oxides normally are quite volatile, in this method of preparation only a small amount of rhenium was lost during drying and calcination.

Catalyst A has a surface area of 116 m.²/g., a pore volume of 0.20 cc./g., and an average pore diameter of 69 angstroms.

EXAMPLE 2

A portion of Catalyst A of Example 1 was calcined in flowing air for an additional 2 hours at 1200° F., to produce Catalyst B, having a surface area of 130 m.²/g., a pore volume of 0.226 cc./g., and an average pore diameter of 70 angstroms.

EXAMPLE 3

A layered aluminosilicate-nickel catalyst (Catalyst C) was prepared in the following manner:

These starting materials were used:
1. 600 grams of a layered clay-type aluminosilicate in finely divided form;
2. 200 grams of nickel nitrate, $Ni(NO_3)_2 \cdot 6H_2O$, dissolved in 665 ml. of $H_2O$.

The layered aluminosilicate, in powder form, was mixed with the nickel nitrate solution, followed by addition of an additional 100 ml. $H_2O$ and further mixing, to form a pasty mass. The pasty mass was dried in a vacuum oven for 6 hours at room temperature, then at 200°–250° F. for approximately 16 hours. The resulting dried material was broken into 8–16 mesh particles. The particles were calcined in flowing air for 4 hours at 460° F., then for 4 hours at 900° F. The resulting catalyst upon analysis was found to contain 8.0 weight percent nickel, calculated as metal, and was found to have a density of 0.94 grams/ml. and a BET nitrogen surface area of 123 m.² per gram.

EXAMPLE 4

A portion of Catalyst C of Example 3 is calcined in flowing air for an additional 2 hours at 1100° F., to produce Catalyst D.

EXAMPLE 5

A layered aluminosilicate-palladium catalyst (Catalyst E) was prepared in the following manner.

These starting materials were used:
(1) 500 grams of a layered clay-type aluminosilicate in finely divided form;
(2) 6.8 grams of tetramino palladium nitrate

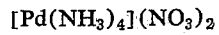

$[Pd(NH_3)_4](NO_3)_2$ dissolved in 700 ml. of $H_2O$.

The layered aluminosilicate in powder form was mixed with the tetramino palladium nitrate solution, to form a pasty mass. The pasty mass was dried in a vacuum oven for 6 hours at room temperature, then at 200°–250° F. for approximately 16 hours. The resulting material was tabletted, and then calcined in flowing air for 4 hours at 460° F., then for 4 hours at 900° F. The resulting catalyst upon analysis was found to contain 0.5 weight percent palladium, calculated as metal.

EXAMPLE 6

A portion of Catalyst E of Example 5 is calcined in flowing air for an additional 4 hours at 1200° F., to produce Catalyst F.

EXAMPLE 7

A layer aluminosilicate-palladium catalyst (Catalyst G) was prepared in the following manner.

These starting materials were used:
(1) 500 grams of a layered clay-type aluminosilicate in finely divided form;
(2) 4.24 grams of palladium chloride, $PdCl_2$, dissolved in 700 ml. $H_2O$, containing a few drops of concentrated hydrochloric acid.

The layered aluminosilicate in powder form was impregnated with the palladium chloride solution, and the resulting catalyst was dried and calcined as in Example 5. The resulting catalyst upon analysis was found to contain 0.5 weight percent palladium, calculated as metal.

EXAMPLE 8

A portion of Catalyst G of Example 7 is calcined in flowing air for an additional 2 hours at 1200° F., to produce Catalyst H.

EXAMPLE 9

Catalysts A through H, of Examples 1 through 8, respectively, are separately used to hydrocrack separate portions of a California light cycle oil of the following description:

| | |
|---|---|
| Gravity, ° API | 30 |
| Aniline point, ° F. | 131 |
| Organic nitrogen p.p.m. | 0.5 |
| Boiling range, ° F. | 400–700 |

The hydrocracking conditions are as follows:

| | |
|---|---|
| Liquid hourly space velocity, v./v./hr. | 1.5 |
| Pre-pass conversion to products boiling below 400° F., vol. percent | 60 |
| Exit gas rate, s.c.f./bbl. | 5600 |
| Total pressure, p.s.i.g. | 1200 |

The operating temperatures necessary to maintain the indicated per-pass conversion at two different on-stream times, together with a summary of the catalyst activation conditions, are as follows:

| Catalyst | Catalyst hydro-generating component | Catalyst activation temp., ° F. | Catalyst activation time, hours | Temp. at 120 hours, ° F. | Temp. at 360 hours, ° F. |
|---|---|---|---|---|---|
| A | Re | 950 | 5 | 550 | 558 |
| B | Re | 950<br>1,200 | 5<br>2 | 525 | 602 |
| C | Ni | 460<br>900 | 4<br>4 | 625 | 655 |
| D | Ni | 400<br>900<br>1,100 | 4<br>4<br>2 | 605 | 625 |
| E | Pd | 460<br>900 | 4<br>4 | 503 | 530 |
| F | Pd | 460<br>900<br>1,200 | 4<br>4<br>4 | 500 | 535 |
| G | Pd | 460<br>900 | 4<br>4 | 505 | 531 |
| H | Pd | 460<br>900<br>1,200 | 4<br>4<br>2 | 501 | 536 |

From the foregoing, it may be seen that Catalyst A is less active than Catalyst B at the end of 120 hours, but is more active than Catalyst B at the end of 360 hours. Similarly, Catalyst E is less active than Catalyst F at the end of 120 hours, but is more active than Catalyst F at the end of 360 hours. Similarly, Catalyst G is less active than Catalyst H at the end of 120 hours, but is more active than Catalyst H at the end of 360 hours. Accordingly, Catalysts B, F and H, all activated at 1200° F. have unnecessarily high fouling rates, that is, it is necessary to raise the operating temperature at an unnecessarily high rate in order to maintain the indicated per-pass conversion. Therefore, the catalyst activation temperature should not be as high as 1200° F., but should be no greater than 1150° F.

From the foregoing, it also may be seen that at activation temperatures of 9000° F. catalyst activity in all cases was less than at the higher activation temperatures, and while adequate, would have been unacceptably lower at lower activation temperatures. Accordingly, 900° F. forms the lower limit for the activation temperature range of the process of the present invention.

Although only specific embodiments of the present invention have been described, numerous variations can be made in these embodiments without departing from the spirit of the invention, and all such variations that fall within the scope of the appended claims are intended to be embraced thereby.

What is claimed is:

1. The method of activating a hydrocarbon conversion catalyst comprising a layered crystalline clay-type aluminosilicate component and a hydrogenating component, which comprises heating said catalyst at 900° to 1150° F. for 0.5 to 20 hours, said aluminosilicate component having the emprical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

2. The method as in claim 1, wherein said heating is accomplished in a stream of an oxygen-containing gas.

3. The method as in claim 1, wherein said catalyst comprises a hydrogenating component selected from rhenium and compounds thereof and Group VIII metals and compounds thereof.

4. A hydrocarbon conversion catalyst comprising a layered crystalline clay-type aluminosilicate component and a hydrogenating component selected from rhenium and compounds thereof and Group VIII metals and compounds thereof, said catalyst having an activity as developed therein by heating said catalyst in an oxygen-containing gas stream at 900° to 1150° F. for 0.5 to 20 hours, said aluminosilicate component having the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

References Cited
UNITED STATES PATENTS

| | | | |
|---|---|---|---|
| 3,236,762 | 2/1966 | Rabo et al. | 208—111 |
| 3,252,757 | 5/1966 | Granquist | 23—111 |

DANIEL E. WYMAN Primary Examiner

C. F. DEES, Assistant Examiner

PO-1050
(5/69)

UNITED STATES PATENT OFFICE
CERTIFICATE OF CORRECTION

Patent No. 3,640,904                Dated February 8, 1972

Inventor(s) Sigmund M. Csicsery, Donald A. Hickson, Joseph Jaffe

It is certified that error appears in the above-identified patent and that said Letters Patent are hereby corrected as shown below:

The table at the bottom of Column 4 should read:

| Catalyst | Catalyst Hydrogenating Component | Catalyst Activation Temp., °F. | Catalyst Activation Time, Hours | Temperature at 120 Hours, °F. | Temperature at 360 Hours, °F. |
|---|---|---|---|---|---|
| A | Re | 950 | 5 | 550 | 588 |
| B | Re | 950<br>1200 | 5<br>2 | 525 | 602 |
| C | Ni | 460<br>900 | 4<br>4 | 625 | 655 |
| D | Ni | 400<br>900<br>1100 | 4<br>4<br>2 | 605 | 625 |
| E | Pd | 460<br>900 | 4<br>4 | 503 | 530 |
| F | Pd | 460<br>900<br>1200 | 4<br>4<br>4 | 500 | 535 |
| G | Pd | 460<br>900 | 4<br>4 | 505 | 531 |
| H | Pd | 460<br>900<br>1200 | 4<br>4<br>2 | 501 | 536 |

Signed and sealed this 9th day of January 1973.

(SEAL)
Attest:

EDWARD M. FLETCHER, JR.          ROBERT GOTTSCHALK
Attesting Officer                Commissioner of Patents